United States Patent Office 3,463,855
Patented Aug. 26, 1969

3,463,855
INSECT REPELLENT COMPOSITIONS OF N-(META-TOLUYL)-METHYL PIPERIDINES
Clayton W. Yoho, Racine, Wis., assignor to S. C. Johnson & Son, Inc., Racine, Wis.
No Drawing. Original application May 12, 1965, Ser. No. 455,301. Divided and this application Feb. 26, 1968, Ser. No. 707,969
Int. Cl. A01m 9/22, 17/00
U.S. Cl. 424—267    5 Claims

ABSTRACT OF THE DISCLOSURE

N-(meta-toluyl)-methylpiperidines having the structural formula

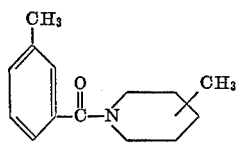

which are useful as insect repellents.

---

The present invention is a divisional application of application Ser. No. 455,301 filed May 12, 1965, now U.S. Patent 3,406,177.

FIELD OF INVENTION

This invention relates to certain toluamides, to processes for their preparation, and to compositions of matter containing these compounds. More particularly, this invention relates to the new and useful compounds represented by the structural formula

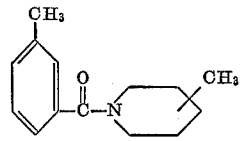   I which includes:

N-(meta-toluyl)-2-methylpiperidine,
N-(meta-toluyl)-3-methylpiperidine, and
N-(meta-toluyl)-4-methylpiperidine, and to compositions of matter containing these compounds which are useful as pest repellents, i.e., they repel a large number of arthropods troublesome to men and animals because of stinging, biting, blood sucking, or other annoying or dangerous activities including the carrying of disease germs. The foregoing structural formula shall be referred to hereinafter as Formula I. Certain of the toluamides of Formula I are particularly useful in spray compositions, as fly repellents. The utility of these compounds and the various compositions of matter containing these compounds is discussed in detail infra.

Pest repellent compositions embodying the Formula I compounds can be provided in all forms customarily used to impart pest repellency. Foh example, one can produce sprays, solutions, emulsions, salves or ointments, lacquers, paints or pastes, etc. The concentration of the active ingredients, which can be one or more of the aforesaid Formula I compounds, may be generally up to about 95% by weight of the composition which comprises a suitable vehicle or carrier, or if desired, a diluent.

Pesticides are generally not capable of either preventing pests from alighting or from biting, which may lead to infection; since the action of pesticides occurs generally after a certain latent period. Pest repellents serve the purpose of deterring pests and especially flying insects from alighting and hence from biting and sucking. Hence, pest repellents serve an important hygienic purpose, and continuous attempts are made to improve the activity of these substances.

The first large scale application of repellents was made during the Second World War by armies fighting and stationed in the tropics. Among the numerous substances which were tested during this period for their repellent activity, only the following four have been used extensively on a commercial scale: phthalic acid dimethylester, succinic acid-di-n-butyl-ester, 3,4-dihydro-2,2-dimethyl-4-oxo-2-H-pyrane-6-carbonic acid-n-butylester, and the dimethyl ester of the cisbicyclo-(2,2,1)-5-heptene-2,3-dicarbonic acid. Today these compounds are obsolete, and at the present time the most efficient repellents are 2-ethyl-hexane-1,3-diol and m-toluic acid di-ethyl-amide.

As appears from the enumeration of the heretofore known highly efficient repellents, they do not show any relationship between chemical composition and repellent activity.

It was surprising to find, in the course of the investigation which resulted in the present invention that the Formula I compounds show repellent activity. This result could not be reasonably expected in view of the fact that compounds closely related to Formula I, i.e., N-(meta-toluyl)-2-ethylpiperidine, do not show repellent activity.

Although it is, of course, possible to use the Formula I compound undiluted, it is usually more suitable, because it achieves even distribution easier and for economic reasons, to dilute the active substance with a solid, liquid, or semi-solid carrier which can itself be a mixture of several substances. Such carriers can be of the most varied nature, but should preferably be harmless to warm-blooded animals, under the condition of use, i.e., in the quantities and concentration used in the chosen method of application.

As solid carriers, there may be mentioned in particular pulverulent organic or inorganic substances such as calcium phosphate, calcium carbonate, kaolin, calcined magnesia, kieselguhr, boric acid, cork meal, wood meal, and especially talc and starch powder. These are impregnated with the active ingredient by known methods. Such dusting agents are particularly suitable for dusting linen and clothing.

As liquid there comes into consideration both organic solvents and inorganic media which fulfill the requirements given above. Organic solvents, such as alcohols, esters, ethers, and ketones, e.g., ethanol, propanol, benzyl alcohol, glycerol, propanone-2, butanone-2, cyclohexenol, and other hydrated phenols, ethylacetate, glycol-monoethylether, cyclohexane, etc., are suitable as carriers both for use on the skin and for impregnating textiles and the like. The form found preferable for repelling insects from the human body is a solution of the compounds according to the invention in low-boiling solvents such as isopropanol.

Solutions in oils of vegetable, animal, mineral, and synthetic origin, such as olive oil, arachis oil, castor oil, and paraffin oil, also come into consideration; such oils are useful for addition to solutions in low-boiling solvent.

For use in spraying, the known spray-solvents are particularly suitable, e.g., mineral oil distillates of the kerosene type, hydrogenated naphthalenes, and alkylated naphthalenes.

Emulsions and dispersions in an aqueous medium are suitable for purposes of spraying. Here the Formula I compound is mixed for this purpose, if necessary, with the addition of organic solvents with surface active agents which may be of the nonionic, cationic, or anionic type.

The concentrate can then be mixed with water to form either a water-in-oil or oil-in-water emulsion. When pressurized repellents are desired, compositions containing water-in-oil emulsions such as described in U.S. Patent 3,159,535 to Sesso et al. are preferred.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

PREPARATION

The toluamides of Formula I can be synthesized by reacting a meta-toluyl halide with the appropriate methylpiperidine in anhydrous ethyl ether.

For example, a solution of meta-toluyl chloride in anhydrous ethyl ether is added incrementally to an agitated solution containing twice the molar amount of the appropriate purified methylpiperidine in anhydrous ethyl ether. The reaction temperature is maintained at from about 10° to about 15° during the reaction and for about an hour after the addition is completed. The resultant white suspension (the HCl salt of the corresponding methylpiperidine) is suction filtered and the cake washed with increments of anhydrous ethyl ether. The combined ethyl ether portions are stored over potassium carbonate for about 12 hours, filtered through Celite, and concentrated in vacuo. The resultant oily amide is redistilled twice in vacuo through an appropriate column. The yields and physical properties of the toluamides of the invention prepared according to the foregoing method are set forth in Table I below.

TABLE I

| Compound | Percent yield | Boiling Pt., ° C./mm. | Refractive index $n_D^{25}$ |
|---|---|---|---|
| N-(meta-toluyl)-2-methylpiperidine | 75.9 | 110–112/0.04 | 1.5398 |
| N-(meta-toluyl)-3-methylpiperidine | 63.9 | 102.6–104.6/0.01 | 1.5368 |
| N-(meta-toluyl)-4-methylpiperidine | 74.7 | 115–116/0.04 | 1.5370 |

In addition to the foregoing, an elementary analysis of these compounds established the presence of C, H, and N in the percentages required for the particular compounds. The presence of amide functionality was established by means of infrared analysis.

A particularly preferred method of producing the toluamides of the invention on a commercial scale comprises introducing a meta-toluyl halide, such as meta-toluyl chloride, dissolved in an aromatic solvent such as benzene into a benzene solution containing an equimolar amount of the appropriate methyl-piperidine. The reaction solution is refluxed until HCl gas ceases to be evolved. The resulting toluamide can be recovered according to conventional procedures. In this reaction, the HCl-methylpiperidine salt is apparently formed but is believed to react with meta-toluyl chloride to form the amide. The resulting HCl gas is insoluble in the reaction solvent and accordingly is discharged from the reaction media as a volatile gas.

ANIMAL PROTECTANT

Two of the toluamides of Formula I, i.e., N-(meta-toluyl)-2-methylpiperidine and N-(meta-toluyl)-4-methylpiperidine, have unexpectedly been found to be uniquely effective in animal protectant spray compositions, particularly against stable flies. This animal protectant property is particularly unobvious when these compounds are compared with the third compound included in Formula I, i.e., N-(meta-toluyl)-3-methylpiperidine. That is, the latter compound was wholly inactive as an animal protectant spray composition against stable flies under the test conditions described below, whereas the former compounds were extremely effective under similar conditions. All of the Formula I compounds were screened in animal protectant spray compositions according to the spot-test method described in detail by Roberts et al. in the Journal of Economic Entomology, (1960) 53(2), pp. 301–303.

ANIMAL PROTECTANT TESTS AGAINST STABLE FLIES

In this test, an area six inches in diameter on the side of a cow is sprayed with 5 ml. of an acetone solution containing 5% by weight of the particular Formula I compound. If the hair on the cow is greater than about ¼ to ½ inch in length, it is clipped so that the flies can reach the skin to feed. Five or six test areas are spaced on either side of the animal and are positioned so that cross-contamination is unlikely. The cows are confined in individual temperature and humidity controlled stalls and subjected to sunlamp exposure four hours daily through the test period.

The stable flies are confined to said six-inch treated test areas by means of a screen wire cage. Twenty-five three- to six-day-old female stable flies that have not been fed for about 18 hours are confined to each test area for 20 minutes. After exposure, the flies are moved to a constant temperature room for holding at 72° F. and 75% relative humidity.

Repellency is measured by subtracting the percentage of flies that feed from 100%. When more than 20% of the flies feed, the compound is considered to have failed as a repellent. The compounds tested (at 5% by weight concentration) are compared to a standard repellent composition containing 0.05% by weight pyrethrins, which is effective for 4 days. The compounds tested are rated according to the following classifications:

Class I—Ineffective at 1 day
Class II—Effective at 1 day
Class III—Effective at 2–3 days
Class IV—Effective at 4 or more days When tested according to the procedure described above, the Formula I compounds gave the following results: N-(meta-toluyl)-2-methylpiperidine, Class IV; N-(meta-toluyl)-3-methylpiperidine, Class I; and N-(meta-toluyl)-4-methylpiperidine, Class III. Thus, the composition containing N-(meta-toluyl)-2-methylpiperidine is effective for 4 or more days and the composition containing N-(meta-toluyl)-4-methylpiperidine is an effective repellent for 2 or 3 days.

STABLE FLY AND MOSQUITO REPELLENCY

Concentrations of one, two, and five percent by weight of diethyltoluamide and of N-(meta-toluyl)-2-methylpiperidine respectively were applied to 12″ x 12″ cheese cloth sleeves. The treated sleeves were air dried for about thirty minutes, wrapped around the forearm of human test subjects, and exposed for about three minutes to caged populations of stable flies (Stomoxys calcitrans) and mosquitoes (Aedes aegypti). The treated sleeves were reexposed under the same conditions at one-half hour intervals until they were non-repellent, i.e., two bites during an exposure qualifies the treated sleeve as non-repellent. Results of these tests are set forth in Table II below.

pound in an amount sufficient to repel insects selected from the group consisting of N-(meta-toluyl)-2-methylpiperidine and N-(meta-toluyl)-4-methylpiperidine and a

TABLE II

| Compound | Percent by weight | Period after first exposure (in hrs.) | | | | | | | | |
|---|---|---|---|---|---|---|---|---|---|---|
| | | 2 | 3 | 4.5 | 5.5 | 6.5 | 7 | 8 | 24 | 48 |
| Diethyltoluamide | 1 | R | R | N.R. | N.R. | | | | | |
| Do | 3 | R | R | N.R. | N.R. | | | | | |
| Do | 5 | R | R | N.R. | N.R. | | | | | |
| N-(meta-toluyl)-2-methyl-piperidine | 1 | R | R | R | R | R | R | R | R | N.R. |
| Do | 3 | R | R | R | R | [1] R | R | R | R | N.R. |
| Do | 5 | R | R | R | R | R | R | R | R | N.R. |

[1] =One bite.
R=Repellent.
N.R.=Non-repellent, i.e., 2 or more bites per exposure.

HOUSEFLY REPELLENCY USING SANDWICH BAIT METHOD

To file cards (3" x 5") which were covered with a thin layer of molasses, lens tissues were applied which had been treated with solutions of diethyltoluamide and N-(meta-toluyl)-2-methylpiperidine. The resultant test "sandwiches" were exposed at about thirty-minute intervals to a cage containing from about 50 to about 75 starved adult houseflies (*M. domestica*). The treated test sandwich was considered non-repellent (N.R.) if about 20 or more flies were found feeding through the repellent treated test sandwich. The results of the test are set forth in Table III below.

carrier for said compound, said carrier being compatible with and inert with respect to said compound.

2. A fly repellent composition for animals comprising N-(meta-toluyl)-2-methylpiperidine in an amount sufficient to repel flies and a carrier for said compound, said carrier being compatible with and inert with respect to said compound.

3. A fly repellent composition for animals comprising N-(meta-toluyl)-4-methylpiperidine in an amount sufficient to repel flies and a carrier for said compound, said carrier being compatible with and inert with respect to said compound.

4. The fly repellent composition of claim 2 in spray form.

TABLE III

| Compound | Percent by weight | Period after first exposure (in hrs.) | | | | | | | | |
|---|---|---|---|---|---|---|---|---|---|---|
| | | 2 | 3 | 4.5 | 5 | 6 | 7 | 8 | 26 | 30 | 48 |
| Diethyltoluamide | 1 | N.R. | N.R. | | | | | | | |
| Do | 3 | R | N.R. | N.R. | | | | | | |
| Do | 5 | R | R | N.R. | N.R. | | | | | |
| (Control) | | N.R. | | | | | | | | |
| N-(meta-toluyl)-2-methylpiperidine | 1 | R | R | N.R. | N.R. | | | | | |
| Do | 3 | R | R | R | R | R | R | R | R | R | N.R. |
| Do | 5 | R | R | R | R | R | R | R | R | R | N.R. |

I claim:
1. An insect repellent composition comprising a compound

5. The fly repellent composition of claim 3 in spray form.

References Cited

UNITED STATES PATENTS

| | | | |
|---|---|---|---|
| 2,166,120 | 6/1939 | Bousquet | 260—294.7 |
| 2,589,205 | 3/1952 | Pohland | 260—294.8 |
| 3,051,620 | 8/1962 | Abood | 260—294.7 |
| 3,222,203 | 12/1965 | Skau et al. | 260—294.7 |
| 2,476,913 | 7/1949 | Reitsema | 260—294 |
| 2,498,430 | 2/1950 | Lee | 260—294 |
| 2,890,150 | 6/1950 | Baldwin | 167—33 |
| 3,102,071 | 8/1963 | Hodge | 167—33 |
| 2,589,943 | 3/1952 | Jensen | 260—294.3 |

ALBERT T. MEYERS, Primary Examiner

S. J. FRIEDMAN, Assistant Examiner